United States Patent [19]
Ilic et al.

[11] Patent Number: 6,031,747
[45] Date of Patent: Feb. 29, 2000

[54] INTERLEAVED SYNCHRONOUS FLYBACK CONVERTER WITH HIGH EFFICIENCY OVER A WIDE OPERATING LOAD RANGE

[75] Inventors: Milan Z. Ilic, Clifton Park; Robert L. Steigerwald, Burnt Hills, both of N.Y.

[73] Assignee: Lockheed Martin Missiles & Space Company, Sunnyvale, Calif.

[21] Appl. No.: 09/366,044

[22] Filed: Aug. 2, 1999

[51] Int. Cl.[7] .................................................. H02M 3/335
[52] U.S. Cl. .............................................. 363/71; 363/21
[58] Field of Search ........................................ 363/21, 71

[56] References Cited

U.S. PATENT DOCUMENTS

| | | | |
|---|---|---|---|
| 5,594,629 | 1/1997 | Steigerwald | 363/21 |
| 5,796,595 | 8/1998 | Cross | 363/71 |
| 5,875,103 | 2/1999 | Bhagwat et al. | 363/17 |
| 5,959,438 | 9/1999 | Jovanovic et al. | 363/21 |

OTHER PUBLICATIONS

Kirchenberger; Fischer; Schroder, "Analysis of a Constant Frequency Series–Parallel Multiresonant converter for High Power and Incoreased Output voltages", IEEE Electronic Library, pp. 76–82, 1993.

Wei and Ioinovic, "DC–DC Zero Voltage Transiton Converter with PWM Control and Low Stresses on Switches", IEEE Electronic Library, pp. 523–529, 1995.

Heng and Oruganti, "Family of Two Switch Soft Switched Asymmetrical PWM DC/DC Converters", IEEE Electronic Library, pp. 85–94, 1994.

Nakaoka; Chibani; Yonemori; Ueda; and Ogino, "Resonant Flyback Switched Mode DC–DC Converters Using Static Induction Power Devices", IEEE Electronic Library, pp. 466–474, 1988.

*Primary Examiner*—Peter S. Wong
*Assistant Examiner*—Gary L. Laxton

[57] ABSTRACT

The present invention provides a switching power supply which operates at a high efficiency over a wide operating load range. When the output power is below a first power level, the first power converter stage operates in a hard-switching mode and the second power converter stage is off. When the output power is greater than the first power level and less than a second power level, the first power converter stage operates in a soft-switching mode and the second power converter stage is off. When an output power is greater than the second power level, the first power converter stage operates in a soft-switching mode and the second power converter stage operates in a soft-switching mode.

11 Claims, 7 Drawing Sheets

(PRIOR ART)

INTERLEAVED SYNCHRONOUS FLYBACK CONVERTER WITH HIGH EFFICIENCY OVER A WIDE OPERATING LOAD RANGE

FIELD OF THE INVENTION

The present invention relates generally to power converters and, more particularly, to dc-to-dc power converters amenable to high-density packaging techniques with the capability of zero voltage switching.

BACKGROUND OF THE INVENTION

In recent years, there has been a significant effort oriented towards reducing the size and weight of power supply systems. Size and weight are very important power-supply design goals, especially for applications in space systems such as satellite power systems.

Reducing the size and weight of power supply systems typically requires reducing the size and weight of magnetic elements such as inductors and transformers, which are normally the most voluminous power supply elements. Power supply systems which operate at higher switching frequencies generally require smaller magnetic elements, and thus one way to reduce power supply system size is to operate at as high a switching frequency as possible.

There is a trade-off for operating at higher switching frequencies, however. An increase in switching frequency results in increased power losses dissipated in the power switches as well as increased electromagnetic interference (EMI) noise and switching communication problems, due to the rapid ON/OFF switching of the semiconductor switches at high voltage and current levels.

These consequences of increased switching frequency are especially significant in conventional "hard-switched" power converters. Conventional pulse width-modulated (PWM) converters are "hard-switched" meaning that the main semiconductor switch is turned off and on while carrying substantial currents or blocking substantial voltage. The consequences of operating at higher switching frequencies put a practical upper bound on the usable frequency range for conventional hard-switched pulse-width-modulated (PWM) topologies.

A number of DC to DC switching converter topologies have been invented which attempt to increase switching frequency without increasing converter switching losses significantly. One method of reducing switching losses and EMI noise caused by high switching frequencies is the use of "resonant" switching techniques which overcome some of the switching losses of hard-switched PWM topologies. Resonant switching techniques comprise the inclusion of some type of LC subcircuit in series with a semiconductor switch which, when turned ON, creates a resonating subcircuit within the converter. Timing the ON/OFF control cycles of the resonant switch to correspond with particular voltage and current conditions across respective converter components during the switching cycle allows for operating the switch with zero-voltage across and zero current through the switch, which inherently reduces most of the switching losses attributed to hard-switched PWM converters. Resonant switching is also referred to as "soft" switching, "zero voltage" switching (ZVS).

Although resonant switching converters provide the advantage of reducing switching losses by switching with zero voltage across and zero current through the power switches, resonant converters also have some disadvantages over conventional hard-switching converters. These disadvantages include:

(1) Resonant converters require a more complicated control technique for timing the ON/OFF cycles of the primary and secondary power switches, and hence need more complicated control circuitry;

(2) Resonant converters require the addition of resonant magnetic circuit elements. In resonant circuits, typically a resonant inductor and capacitor are needed to form a resonant circuit circulating energy stored in the leakage inductance of the transformer.

(3) Resonant converters cause increased "circulating current" which is energy being circulated back and forth between the primary and secondary windings rather than being delivered out to the load. This circulating current results in higher conduction ($I^2R$) losses dissipated in circuit components in the primary and secondary.

(4) Resonant converters have a relatively large $I^2R$ losses due to the shape of the secondary waveform. In a resonant converter, the secondary current rises sharply to a high peak current value, and then falls off sharply to zero. This waveform shape results in a relatively high RMS value of current and corresponding high $I^2R$ losses in comparison to a current waveform with lower peak current transferring the same amount of energy. The resistive losses ($I^2R$) in the secondary winding and secondary circuit are proportional to the square of the RMS current. This effect is especially pronounced at light loads. For very light loads, the average value of secondary current $I_{SEC}$ is close to zero, but peak-to-peak value of $I_{SEC}$ will stay constant resulting in significant $I^2R$ losses.

(5) The secondary current waveform generally includes a substantial output ripple current because there are substantial periods of time in which no secondary current is delivered to the output capacitor of the power converter. Specifically, during the drive cycles of a flyback power converter, no current flows through the secondary winding to the output capacitor. Consequently, there is zero power contribution from the power converter to the output capacitor during these time periods. During zero power contribution periods, the output capacitor will continue to provide the output current required by the load while receiving no current from the power transformer, which results in fluctuations in the output voltage of the output capacitor, which fluctuations are known as "output ripple voltage." This places stress on the output capacitor, puts undesirable ripple voltage on the output waveform, and dissipates power in the output capacitor. To reduce these negative consequences requires using a capacitor with very low equivalent series resistance (ESR) and very low equivalent series inductance (ESL).

U.S. Pat. No. 5,594,629 to Steigerwald discloses a circuit which helps to reduce some of these resonant converter disadvantages. This patent discloses a power converter which requires fewer components, a simpler control technique, and reduced circulating current by operating in a "natural" zero-voltage switching mode. In natural zero-voltage switching mode, the primary-side power switch is turned OFF before the secondary side drain current reverses, reducing the amount of circulating current. By timing the secondary side power switch to turn ON a short time after the primary side power switch has turned OFF, natural zero voltage switching is achieved.

U.S. Pat. No. 5,796,595 to Cross discloses an interleaved continuous flyback power converter system. The patent discloses using two interleaved power converters which reduces current ripple and $I^2R$ losses. However, while this interleaved converter operates efficiently at high power levels, its efficiency is poor at lower power levels.

What is needed is a PWM converter which can be contained in a small volume and operate at high efficiency over a wide range of output power levels.

SUMMARY OF THE INVENTION

The present invention provides a switching power supply comprising first and second power converter stages coupled in parallel. Each of the converter stages comprises a transformer having a primary winding and a secondary winding, a primary-side power switch connected in series to the primary winding of the transformer, and a secondary-side power switch connected in series to the secondary winding of said transformer. When the combined output power of the first and second power converter stages is below a first power level, the first power converter stage operates in a hard-switching mode and the second power converter stage is off. When the output power of the first and second power converter stages is greater than the first power level and less than a second power level, the first power converter stage operates in a soft-switching mode and the second power converter stage is off. When an output power of the first and second power converter stages is greater than the second power level, the first power converter stage operates in a soft-switching mode and the second power converter stage operates in a soft-switching mode. This topology and control method provides a high efficiency over a wide operating load range.

DETAILED DESCRIPTION

Figure 1:
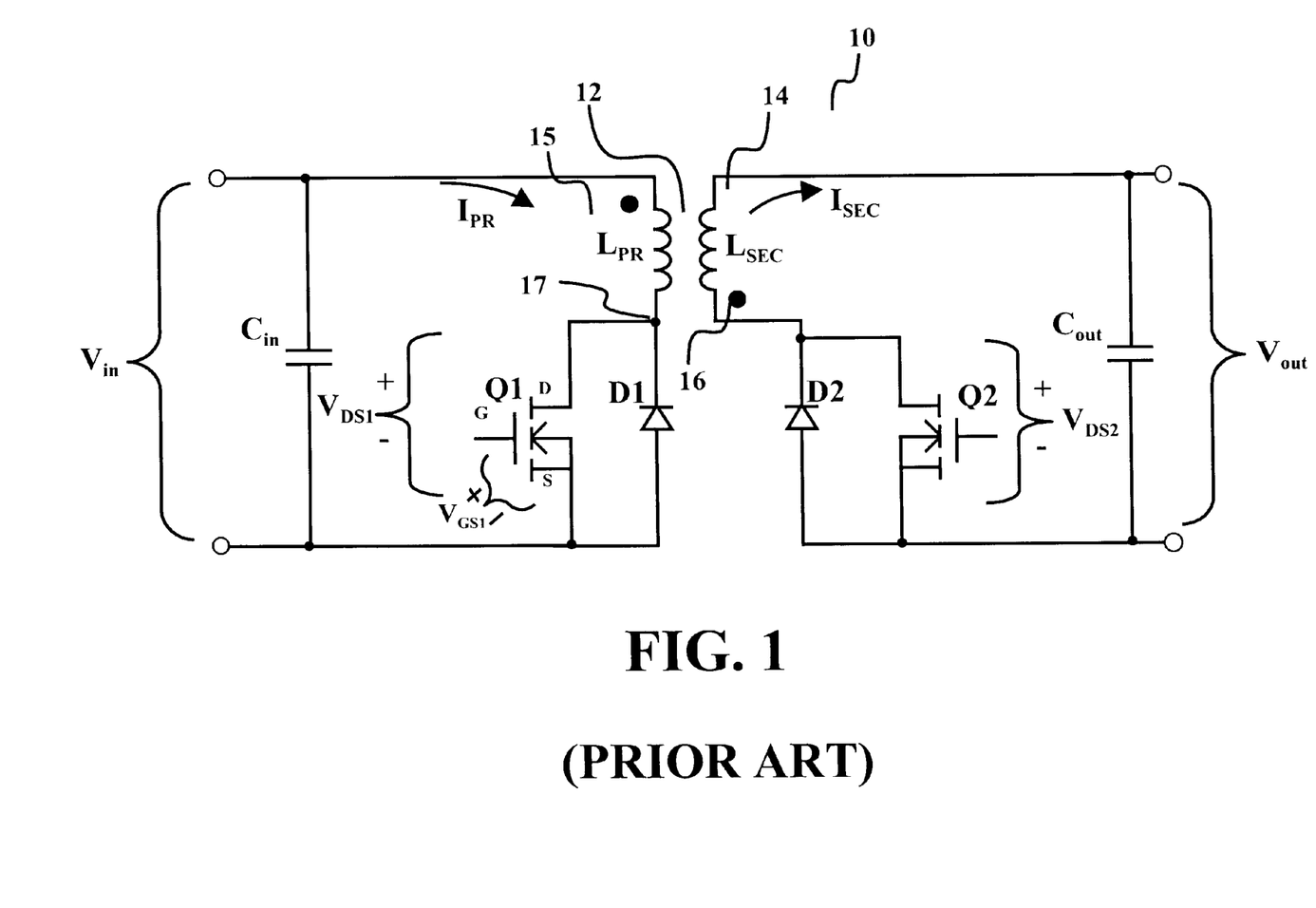
FIG. 1 is a schematic illustrating a flyback converter of the prior-art.

FIG. 1 illustrates a prior art flyback switching cell 10 comprising transformer 12 with primary winding inductance $L_{PR}$ and secondary winding inductance $L_{SEC}$. A primary-side power switching device (e.g., an FET) Q1 is connected in series with primary winding $L_{PR}$ across an input dc voltage $V_{IN}$ and input filter capacitor $C_{IN}$. A secondary side power switching device Q2 is connected in series with secondary winding $L_{SEC}$. The integral parasitic diodes for switching devices Q1 and Q2 are shown in FIG. 1 as D1 and D2, respectively. The primary-side current is designated as $I_{PR}$ and the secondary-side current is designated as $I_{SEC}$. The output dc voltage $E_{OUT}$ of flyback switching cell 10 is taken across an output filter capacitor $C_{OUT}$.

Figure 2:
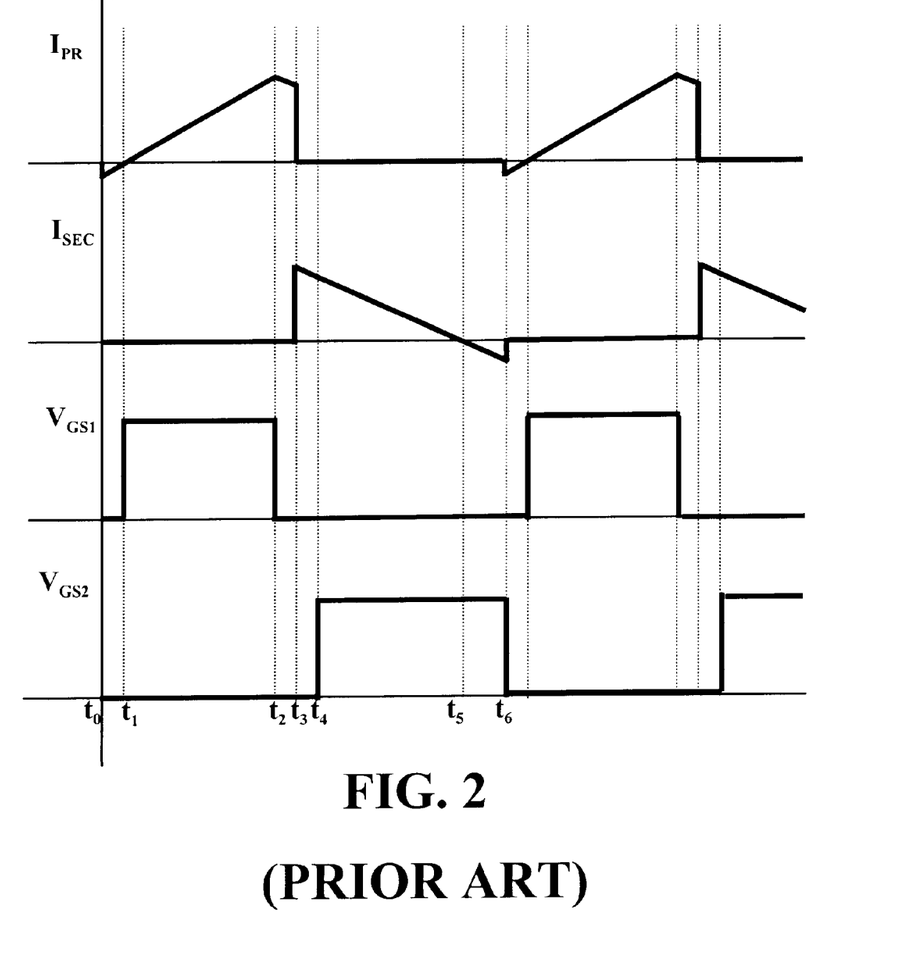
FIG. 2 is a timing diagram illustrating the gate timing of a flyback converter of the prior-art.

FIG. 2 graphically illustrates ideal current and voltage waveforms for operating the converter of FIG. 1 in a zero-voltage switching mode, i.e., switching the power switching devices Q1 and Q2 with zero voltage across. When operating in zero-voltage switching mode, charge that is stored in the output capacitances of Q1 and Q2 is not dissipated within the devices when they are turned on. Instead, the energy is resonated back to the DC supply as energy stored in the primary and secondary magnetizing inductance resonates with the output capacitance of the FETs Q1 and Q2 to ring the voltage across them to zero before the gates are turned on.

This zero-voltage switching operation is described more specifically as follows. Initially, at time t0 both Q1 and Q2 are OFF. At time $t_1$, a voltage control signal $V_{GS1}$ applies a positive voltage to the gate of Q1 causing Q1 to turn ON. When Q1 is ON, current $I_{PR}$ circulates in the "forward" direction, i.e. the direction of the arrow shown in FIG. 1 accompanying $I_{PR}$. This forward circulation of current $I_{PR}$ through the primary winding generates a magnetic field which causes energy to be built up in the primary winding inductance.

At time $t_2$, voltage control signal $V_{GS1}$ returns to zero voltage, shutting Q1 OFF. This causes the magnetic field of the transformer to collapse and the transformer winding voltages reverse polarity. This causes the "undotted" terminals 14 and 16 of the transformer windings to become positive, and the energy stored in the inductance is released (1) as a current in the primary in the form of a resonating current which charges the parasitic capacitance of Q1, and (2) a secondary current $I_{SEC}$ begins flowing in the secondary winding in the direction of the arrow $I_{SEC}$ as shown. This secondary current has the initial effect of reducing Q2's drain voltage $V_{DS2}$ to zero since it discharges Q2's output capacitance before Q2 is turned on, thus providing zero-voltage switching.

At time $t_4$, voltage control signal $V_{GS2}$ applies a positive voltage to the gate of power switching device Q2 causing Q2 to turn ON allowing $I_{SEC}$ to flow in the secondary winding releasing the energy built up in the transformer during the drive cycle. After the secondary current $I_{SEC}$ through Q2 falls to zero as the transformer releases its energy, device Q2 is kept on momentarily (between $t_5$ and $t_6$) so that the current momentarily reverses in Q2, i.e., flows from drain to source from the "dotted" terminal 17 of winding inductance $L_{SEC}$.

Q2 is then turned off at $t_6$, and the energy stored in inductance $L_{SEC}$ causes the "dotted" terminals 15 and 17 of the transformer 12 to become positive, driving Q1's drain voltage $V_{DS1}$ to zero before Q1 turns on. Thus, Q1 is turned on with zero voltage across it. In this manner, turning off one FET, Q1 or Q2, causes the other FET to be switched with zero voltage across. By varying the on-time of Q1, the output voltage can be regulated using constant frequency PWM control.

Disadvantageously, in the circuit of FIG. 1, there is a trade off to achieving zero-voltage switching. As discussed previously, zero-voltage switching introduces undesirable circulating current. Energy is circulated back and forth between primary and secondary windings in order to ring voltages $V_{DS1}$ and $V_{DS2}$ across FET's Q1 and Q2, respectively, to zero. This necessarily results in higher current in the switches Q1 and Q2 then would otherwise be present in a conventional hard-switched flyback circuit. Additionally, this topology has an undesirably high ripple current in the output capacitor.

Figure 3:
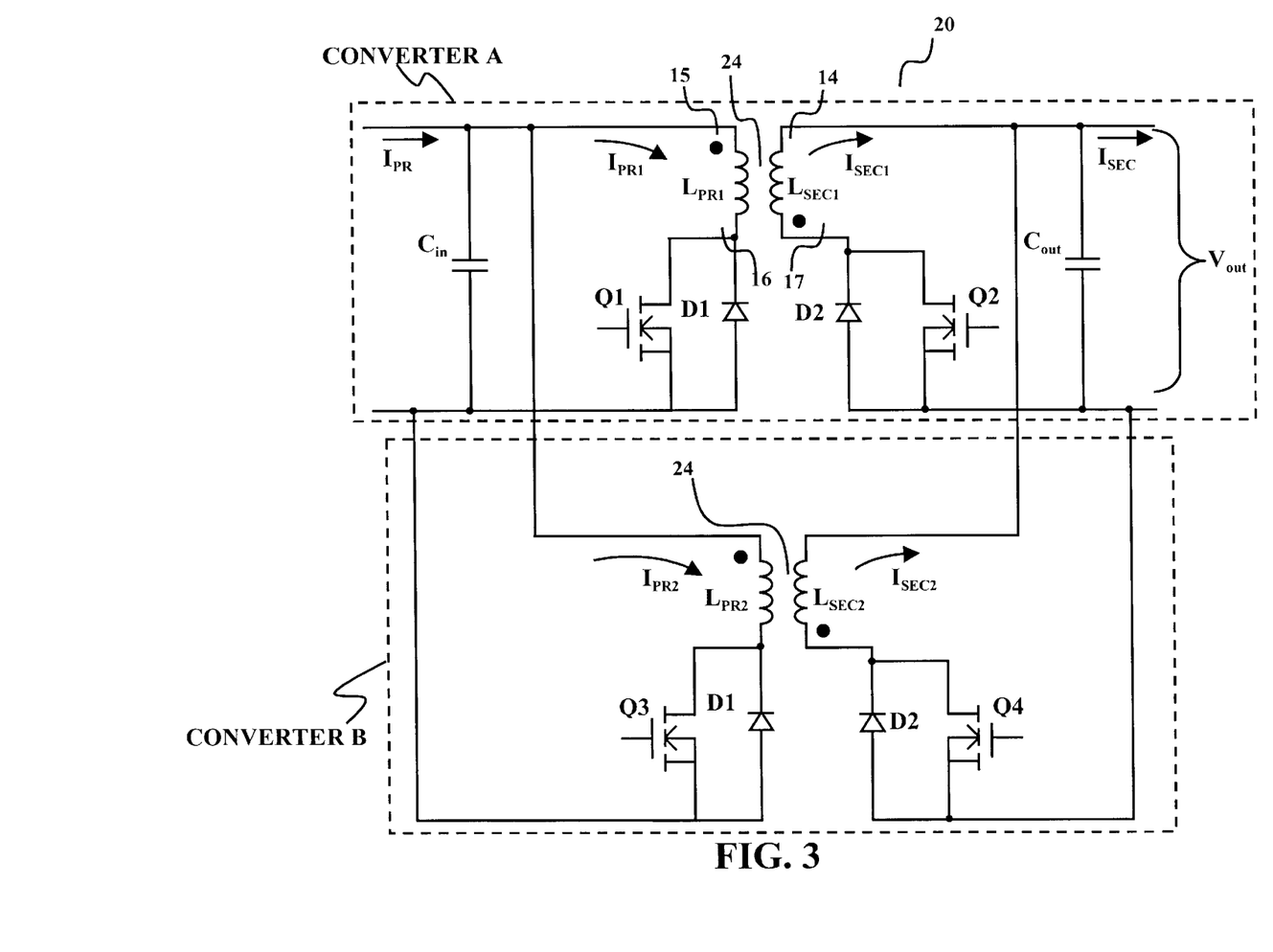
FIG. 3 is a schematic illustrating the interleaved flyback converter of the present invention.

Using the circuit of the present invention, shown in FIG. 3, these disadvantages are reduced. Two flyback converter stages are coupled in parallel. The switching of converter stage A is performed with 180° phase shifting with respect to the switching of converter stage B. This is referred to herein as interleaved operation. The transformers 22 and 24 can each be twice as small as the transformer 12 in the non-interleaved circuit, since each of transformers 22 and 24 process half the output power. Secondary side power switches Q2 and Q4 may be synchronous rectifiers, which have very low ON-resistance, and hence incur low conduction losses.

Figure 4:
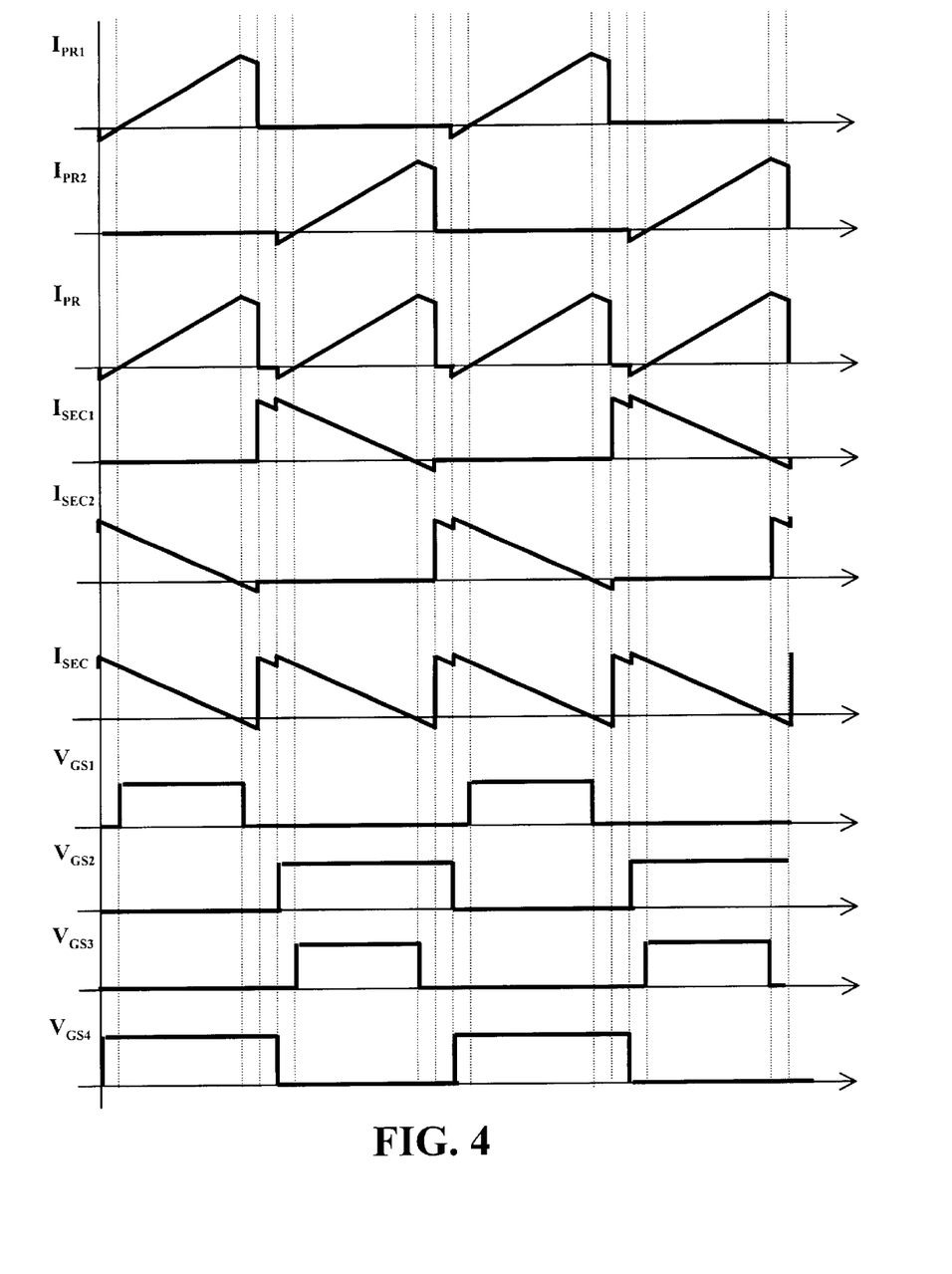
FIG. 4 is a timing diagram illustrating the gate timing of interleaved flyback operation of the present invention.

FIG. 4 shows a timing diagram illustrating the operation of the interleaved converter with converter stages A and B both operating in a synchronous soft-switching mode. As is shown in FIG. 4, the two interleaved converter stages A and B are switched such that primary currents in each of the interleaved converter stages, $I_{PR1}$ and $I_{PR2}$ are 180 degrees out of phase, and secondary currents $I_{SEC1}$ and $I_{SEC2}$ are also 180 degrees out of phase. Input current $I_{PR}$ flows from the input power source and splits into currents $I_{PR1}$ and $I_{PR2}$. Secondary currents $I_{SEC1}$ and $I_{SEC2}$ combine to form total output secondary current $I_{SEC}$.

By using this interleaved configuration, currents $I_{PR}$ and $I_{SEC}$ flow every half-cycle rather than flowing for one half-cycle followed by being off for one half-cycle. Because $I_{PR}$ and $I_{SEC}$ flow every half-cycle, the peak value of these currents is half as large as they would have to be to deliver the same amount of energy as the non-interleaved converter currents $I_{PR}$ and $I_{SEC}$ shown in FIG. 2.

Operating at a reduced peak current results in a lower RMS current and hence reduces power dissipation due to $I^2R$ losses. Additionally, operating at half peak current results in half as much peak circulating current between the primary and secondary and half as much current flowing through the output capacitor. This results in reduced $I^2R$ losses, reduced output voltage ripple, and reduced power dissipated in the output capacitor. The output capacitor $C_{OUT}$ can therefore be twice as small.

The converter stages A and B are operating in a synchronous soft-switching mode. Synchronous soft-switching operation is achieved by turning Q2 ON ($V_{GS2}$ goes HIGH) following a short delay after Q1 is turned OFF ($V_{GS1}$ goes LOW), and turning Q1 ON ($V_{GS1}$ goes HIGH) following a short delay after Q2 is turned OFF ($V_{GS2}$ goes LOW). By allowing a short delay between turn-OFF of Q2 and turn-on of Q1, and between turn-OFF of Q1 and turn-on of Q2 (and similarly for Q3 and Q4), zero voltage switching can be obtained; i.e. Q1–Q4 are switched on with zero-voltage thereacross.

Operation in synchronous soft-switching mode is most efficient at high power levels. At low power levels, the losses due to circulating current introduced by soft-switching operation more than offsets the power savings gained by zero voltage switching (ZVS). For light loads, the average value of secondary current $I_{SEC}$ is close to zero, but peak-to-peak value of $I_{SEC}$ remains high resulting in significant $I^2R$ losses introduced by the circulating current. Thus at low power levels, a conventional hard-switched converter operates more efficiently than a soft-switched converter.

Additionally, interleaved operation is more efficient at high power levels. For light loads operating in an interleaved mode is not efficient. The extra losses due to operating four power switches Q1–Q4 offsets the advantages to interleaved operation discussed previously.

Figure 5:
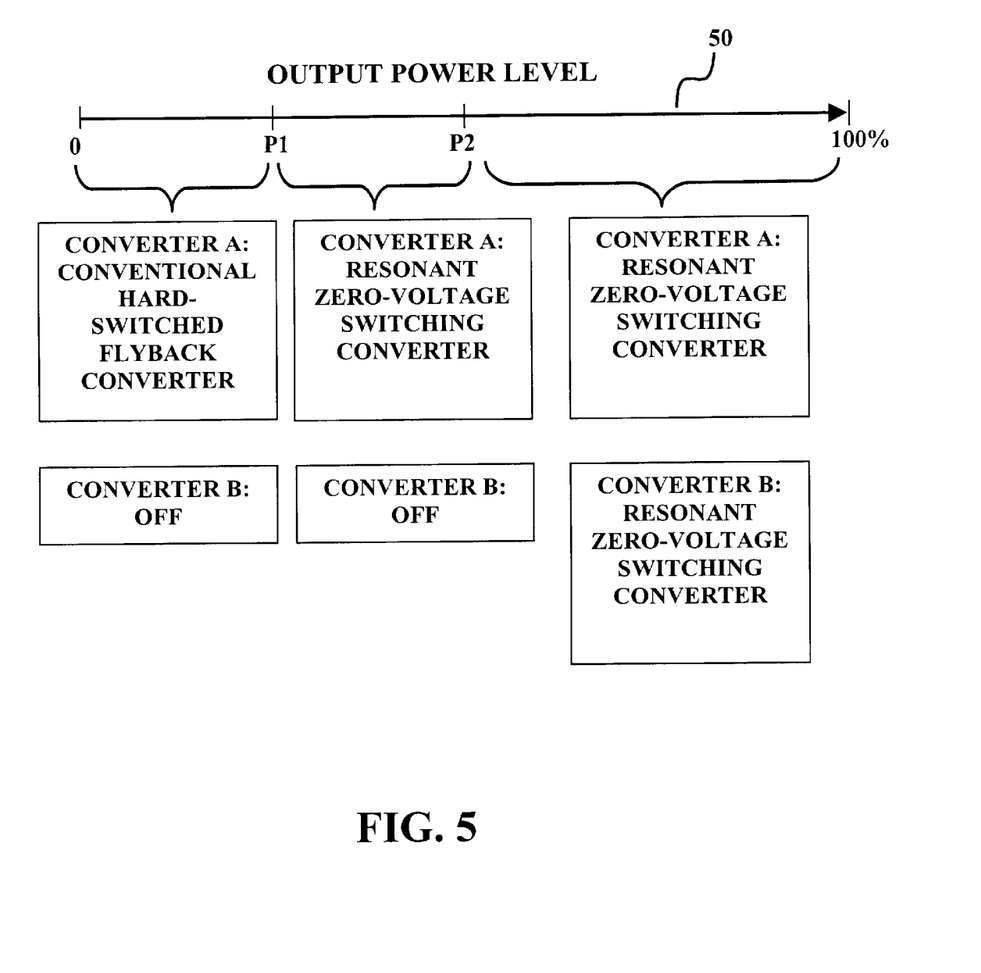
FIG. 5 is a block diagram illustrating the control method of the present invention.

FIG. 5 illustrates a method of controlling the flyback converter of the present invention which utilizes the advantages of conventional hard-switched operation, synchronous soft-switched ZVS operation, interleaved operation, and non-interleaved operation at different power levels to attain a high and flat efficiency over a wide load range.

FIG. 5 shows a range of output power levels 50 from 0 to 100% nominal output power. The output power range is divided into three control ranges: 0% to P1, P1 to P2, and P2 to 100% of nominal output power. In a preferred embodiment of control algorithm, P1 is 25% of nominal output power and P2 is 50% of nominal output power. The converter of the present invention operates as follows for each control range:

a) Output power is less than P1: Converter A works as a conventional hard-switched converter and Converter B is OFF. When converter A is operated as a conventional hard-switched converter there is no circulating current as there is with a soft-switched converter. Additionally, only the primary power switch device Q1 is operated. Q2 remains in a permanent OFF state. Thus there are no gate or drain switching losses for Q2, the FET on the secondary side (or Q3 or Q4 since the Converter B is OFF). Converter A is preferably operated in discontinuous mode, meaning that when energy stored in the transformer is coupled to the secondary, the secondary current reaches zero during the flyback cycle before the a new drive cycle begins.

b) Output power is between P1 and P2: Converter A operates in synchronous soft-switching mode. Converter B is still off. In this range, converter A is taking advantage of the efficiency of zero voltage switching as well as the reduced conductive losses associated with synchronous rectification. The negative effect of circulating current is less significant in this power range than in the lower power range 0–P1. In this output power range, it is more efficient to operate with converter B off, rather than with converter stages A and B in synchronous soft-switched interleaved operation, because in interleaved operation in this power range, the switching power losses due to operating four switches Q1–Q4 offsets the advantages gained by interleaved operation.

c) Output power is higher than P2: Both converter stages A and B are on and operating as interleaved synchronous soft-switched converter stages. In this range, both converter A and converter B are taking advantage of the efficiency of zero voltage switching, interleaved operation, and synchronous rectification. The negative effects of circulating current and operating four switches (Q1–Q4) is insignificant compared to the savings of zero voltage switching and the reduced ripple current provided by interleaved operation.

Figure 6:
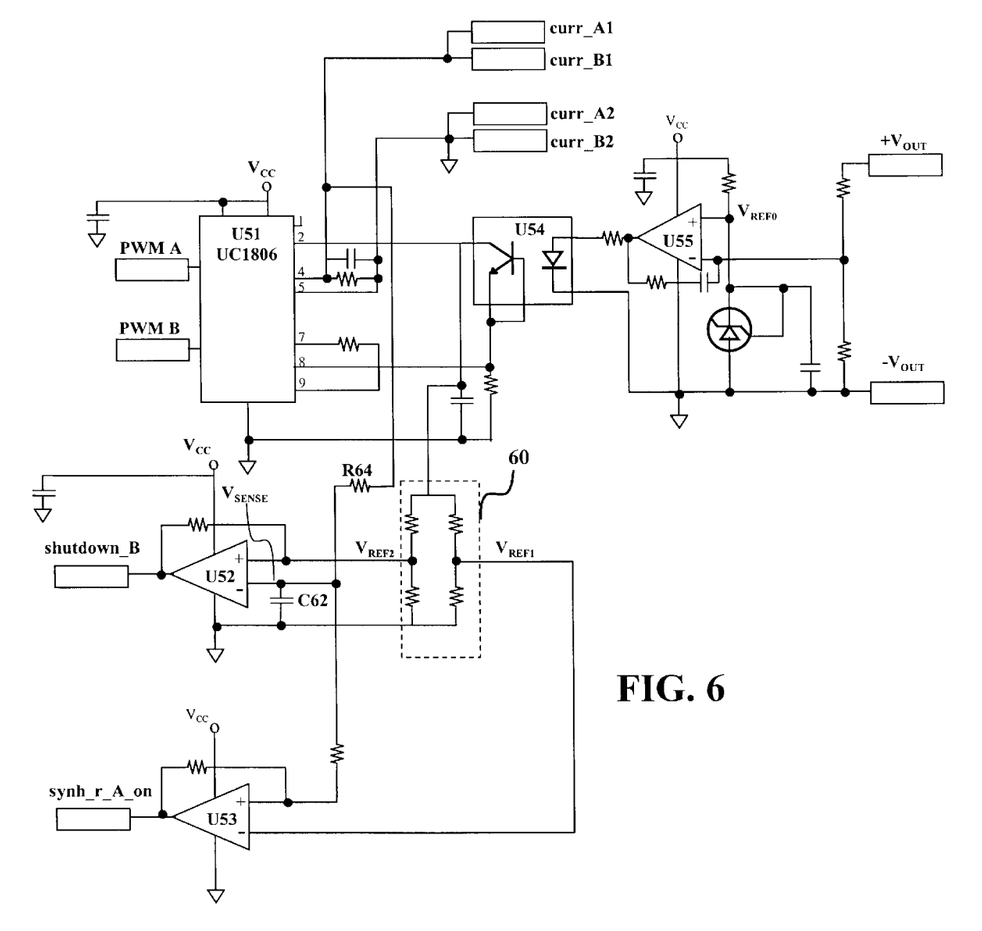
FIG. 6 is an exemplary control circuit for controlling the flyback converter of the present invention.

FIG. 6 illustrates a simple control circuit for controlling the two interleaved PWM flyback converter stages A and B according to the control method depicted in FIG. 5.

The control circuit uses average total primary current as a measure of output power since output power will be proportional to the primary side current. Instead of sensing primary current, a control circuit could also sense secondary current and potentially primary or secondary voltage.

Current signal curr_A1 is produced by a current sensor curr_A which senses primary-side current through FET Q1 in converter A. Current sensor curr_A is, for example, a current transformer or a HEX_SENSE FET. Current signal curr_B1 is produced by a current sensor curr_B which senses secondary-side current through FET Q3 in converter B. Current signal curr_A2 is also produced by current sensor curr_A and current signal curr_B2 is produced by current sensor curr_B. Curr_A2 and Curr_B2 are connected to ground and provided to PWM Controller U51 as a reference.

These current signals are input to PWM Controller U51, so that it can generate square wave PWM signals PWM_A and PWM_B for gating on and off FETs Q1–Q4 to provide proper load sharing between converter stages A and B. A control (or error) signal is generated by optocoupler U54 and op-amp U55 which senses output voltage $V_{OUT}$ (from the secondary side) and compares $V_{OUT}$ to a reference voltage $V_{REF0}$. This control signal is provided to PWM controller U51 to adjust the timing of the square wave signals, PWM_A and PWM_B, to keep output voltage at constant value.

A $V_{SENSE}$ signal is generated from the current signals curr_A1 and curr_B1. $V_{SENSE}$ is a voltage signal proportional to the magnitude of average combined primary side current in converter stages A and B. $V_{SENSE}$ is generated by combining the signals from current sensors curr_A1 and curr_B1 and inputting the combined signal into the low pass filter formed by R64 and C62.

Voltage divider 60 generates two voltage reference levels $V_{REF1}$ and $V_{REF2}$. $V_{REF1}$ is associated with P1 of the control algorithm shown in FIG. 5 and $V_{REF2}$ is associated with P2 ($V_{REF1} < V_{REF2}$).

Comparators U52 and U53 compare $V_{SENSE}$ with $V_{REF2}$ and $V_{REF1}$, respectively. Comparator U53 generates control signal synh_r_A_on which goes HIGH when $V_{SENSE}$ exceeds $V_{REF1}$. Comparator U52 generates control signal shutdown_B which goes LOW when $V_{SENSE}$ exceeds $V_{REF2}$. By using appropriate hysteresis for comparators U52 and U53, uncontrolled turn on and turn off are eliminated.

A summary of the control signal operation is provided in the following table:

| POWER | $V_{SENSE}$ | CONTROL SIGNALS | OPERATION MODE |
| --- | --- | --- | --- |
| 0%–P$_1$ | $V_{SENSE} < V_{REF1} <$ REF2 | synhr_r_A_on: LOW shutdown B: HIGH | Converter A: Hard-Switching Converter B: OFF |
| P$_1$—P$_2$ | $V_{REF1} < V_{SENSE} < V_{REF2}$ | synhr_r_A_on: HIGH shutdown B: HIGH | Converter A: Synchronous Soft-Switching Converter B: OFF |
| P$_2$—100% | $V_{REF1} < V_{REF2} < V_{SENSE}$ | synhr_r_A_on: HIGH shutdown B: LOW | Converter A: Synchronous Soft-Switching Converter B: Synchronous Soft-Switching Interleaved Operation |

1. synh_r_A_on: HIGH level sends PWM control signal to FET Q2 on the secondary side of the converter A so that converter A operates in synchronous soft-switching mode. LOW level turns off FET Q2 on the secondary side of the converter A so that converter A operates in hard-switching mode.

2. shutdown_B: HIGH level turns off the converter stage B. LOW level turns on converter B to operate in synchronous soft-switching mode.

Figure 7:
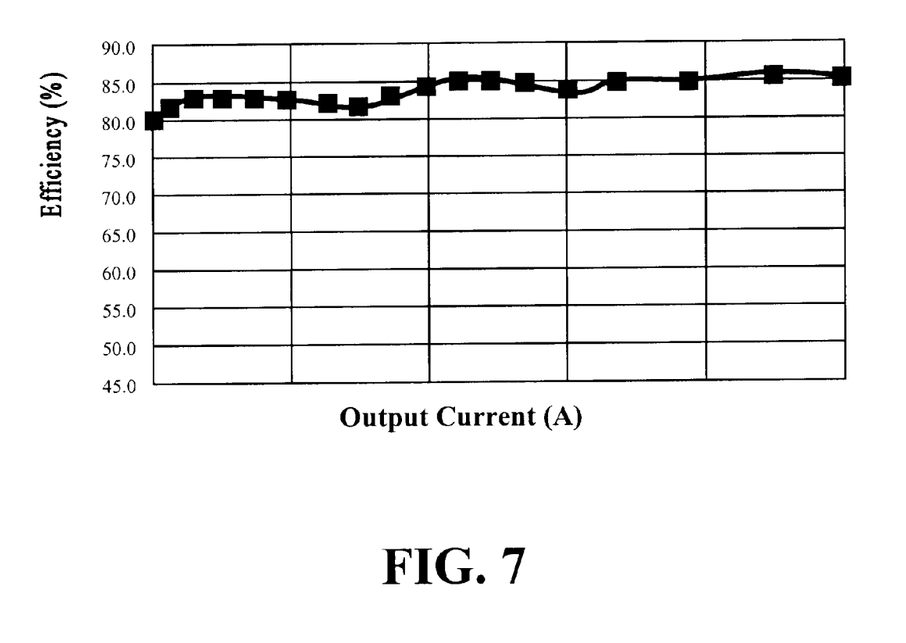
FIG. 7 shows test results for an experimental setup for the present invention.

Using the control circuit shown in FIG. 6, a breadboard was developed and tested with the following parameters: input voltage 28V, output 5V at 10A, and switching frequency 500 kHZ. FIG. 7 shows the experimental results from this setup (without consumption of control circuit). For output currents ranging between 250 mA and 10A measured efficiency was between 80 to 87%. As is shown in FIG. 7, the power converter of the present invention provides high efficiency over a wide load range.

It is to be understood that the embodiments and variations shown and described herein are illustrative of the principles of the invention and that various modifications may be implemented without departing from the spirit and the scope of the invention.

What is claimed is:
1. A switching power supply, comprising:
first and second power converter stages coupled in parallel, each of said converter stages comprising:
a transformer having a primary winding and a secondary winding;
a primary-side power switch connected in series to said primary winding of said transformer; and
a secondary-side power switch connected in series to said secondary winding of said transformer;
wherein when an output power of said first and second power converter stages is below a first power level, said first power converter stage operates in a hard-switching mode and said second power converter stage is off;
wherein when an output power of said first and second power converter stages is greater than said first power level and less than a second power level, said first power converter stage operates in a soft-switching mode and said second power converter stage is off;
wherein when an output power of said first and second power converter stages is greater than said second power level, said first power converter stage operates in a soft-switching mode and said second power converter stage operates in a soft-switching mode.
2. The switching power supply of claim 1, wherein when said first and second power converter stages operate in a soft-switching mode, said first and second power stages are switched in a synchronous soft-switching mode.
3. The switching power supply of claim 1, wherein when an output power of said first and second power converter stages is greater than said second power level, said first power converter and said second power converter stage operate 180 degrees out of phase.
4. The switching power supply of claim 1, wherein when said first power converter stage operates in said hard-switching mode, said secondary power switch for said first power converter stage is OFF.
5. A switching power supply, comprising:
a first power converter comprising:
a transformer having a primary winding and a secondary winding;
a primary-side power switch connected in series to said primary winding of said transformer; and
a secondary-side power switch connected in series to said secondary winding of said transformer;
wherein when an output power of said first power converter stage is below a first power level, said first power converter stage operates in a hard-switching mode;
wherein when an output power of said first power converter stage is greater than said first power level, said first power converter stage operates in a soft-switching mode.

6. The switching power supply of claim 5, further comprising a second power converter stage coupled in parallel to said first power converter stage, said second power converter stage comprising:
- a transformer having a primary winding and a secondary winding;
- a primary-side power switch connected in series to said primary winding of said transformer; and
- a secondary-side power switch connected in series to said secondary winding of said transformer;
- wherein when an output power of said first and second power converter stages is less than a second power level, said second power converter stage is off, and when said output power is greater than said second power level, said second power converter stage is operating in a soft-switching mode.

7. The switching power supply of claim 6, wherein when an output power of said first and second power converter stages is greater than said second power level, said first power converter stage and said second power converter stage operate 180 degrees out of phase.

8. The switching power supply of claim 7, wherein said primary-side power switch and said secondary-side power switch in said first and second power converter stages are FETs.

9. A switching power supply, comprising:
- first and second power converter stages coupled in parallel, each of said converter stages comprising:
  - a transformer having at least one primary winding and at least one secondary winding;
  - at least one primary-side power switch connected in series to said primary winding of said transformer; and
  - at least one secondary-side power switch connected in series to said secondary winding of said transformer;
- wherein each power stage is operable in an operating mode dependent on an output power of said two power stages, wherein said operating mode is one of: a soft-switching mode, a hard-switching mode, and an OFF mode.

10. The switching power supply of claim 9, wherein said at least one secondary-side power switch in said first and second power converter stages are synchronous rectifiers.

11. The switching power supply of claim 10, wherein said soft-switching mode is a synchronous soft switching mode.

* * * * *